United States Patent
Nomaru

(10) Patent No.: US 12,097,642 B2
(45) Date of Patent: Sep. 24, 2024

(54) WAFER PRODUCING METHOD AND WAFER PRODUCING APPARATUS

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 820 days.

(21) Appl. No.: 17/146,657

(22) Filed: Jan. 12, 2021

(65) Prior Publication Data
US 2021/0221026 A1    Jul. 22, 2021

(30) Foreign Application Priority Data

Jan. 22, 2020 (JP) ................. 2020-008605

(51) Int. Cl.
| | |
|---|---|
| *B28D 5/00* | (2006.01) |
| *B23K 26/00* | (2014.01) |
| *B23K 26/53* | (2014.01) |

(52) U.S. Cl.
CPC ........ *B28D 5/0011* (2013.01); *B23K 26/0006* (2013.01); *B23K 26/53* (2015.10); *B28D 5/0052* (2013.01)

(58) Field of Classification Search
CPC .......... H01J 37/32559; H01J 37/32541; C30B 29/06; C30B 25/18; C30B 29/403; B28D 5/0011; B28D 5/0052; B23K 26/0006; B23K 26/53; B23K 2103/56; B23K 26/38; B23K 26/402; B23K 26/702; B24B 7/228; B24B 27/0076; B24B 47/12; B24B 47/20
See application file for complete search history.

(56) References Cited

U.S. PATENT DOCUMENTS

| | | | | |
|---|---|---|---|---|
| 4,244,348 | A * | 1/1981 | Wilkes | B28D 5/00 225/2 |
| 8,835,802 | B2 * | 9/2014 | Baer | B23K 26/40 219/121.64 |
| 8,864,906 | B2 * | 10/2014 | Kuroki | C30B 29/06 117/11 |
| 2013/0252011 | A1 * | 9/2013 | Deshpande | F27B 14/08 65/355 |
| 2019/0030651 | A1 * | 1/2019 | Sekiya | B23K 26/352 |
| 2019/0099838 | A1 * | 4/2019 | Rieske | B23K 26/40 |
| 2019/0382697 | A1 * | 12/2019 | Uchida | H01L 21/304 |

FOREIGN PATENT DOCUMENTS

| | | |
|---|---|---|
| JP | 2000094221 A | 4/2000 |
| JP | 2016111143 A | 6/2016 |

* cited by examiner

*Primary Examiner* — Ratisha Mehta
(74) *Attorney, Agent, or Firm* — Greer Burns & Crain Ltd.

(57) ABSTRACT

A wafer producing method for producing a wafer from a semiconductor ingot includes a thermal stress wave generating step of applying a pulsed laser beam having a wavelength that is absorbable by the semiconductor ingot to the semiconductor ingot held on the chuck table to generate a thermal stress wave and a fracture layer forming step of applying a pulsed laser beam having a wavelength that is transmittable through the semiconductor ingot to the semiconductor ingot in synchronism with a time during which the thermal stress wave reaches a position corresponding to a thickness of a wafer to be produced from the semiconductor ingot, causing the pulsed laser beam whose wavelength is transmittable through the semiconductor ingot to be absorbed in a region where a band gap is reduced by a tensile stress of the thermal stress wave.

3 Claims, 3 Drawing Sheets

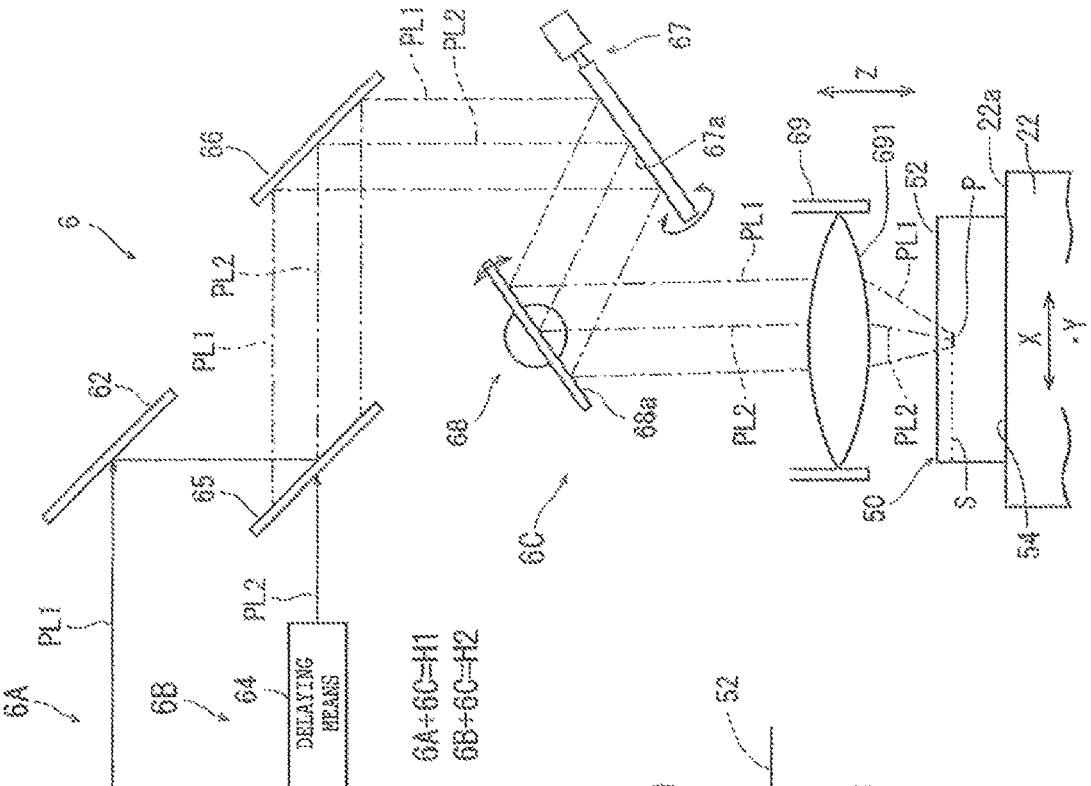
FIG. 2A
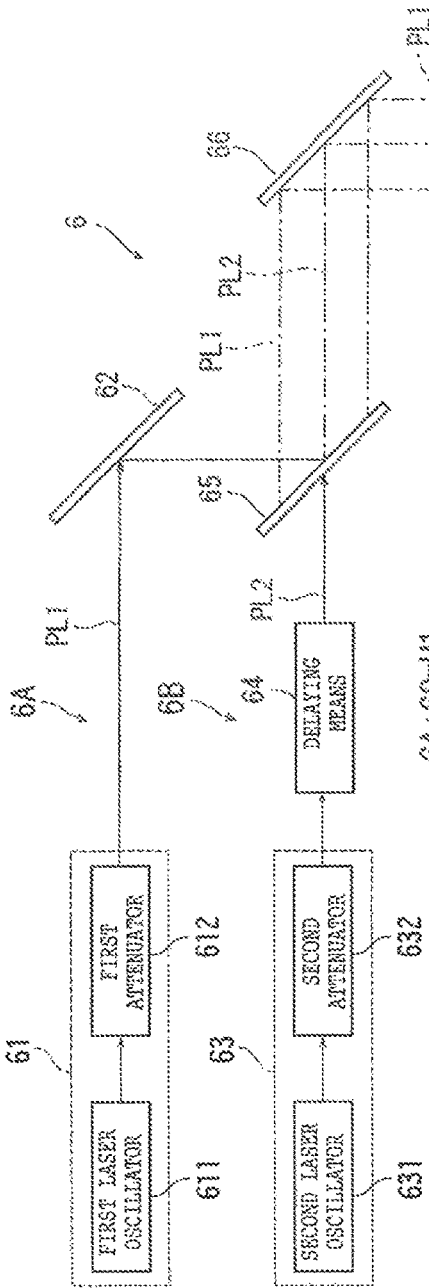
FIG. 2B
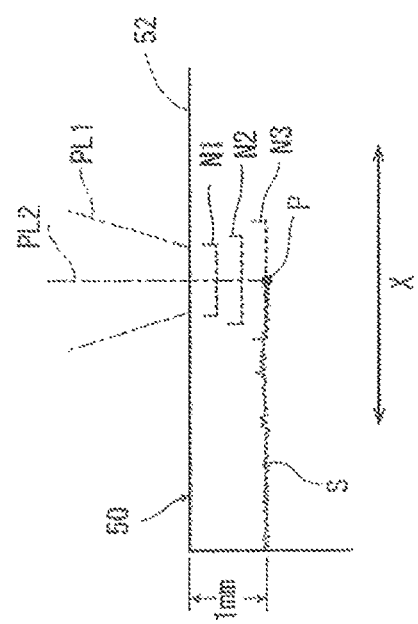

WAFER PRODUCING METHOD AND WAFER PRODUCING APPARATUS

BACKGROUND OF THE INVENTION

Field of the Invention

The present invention relates to a wafer producing method for producing a wafer from a semiconductor ingot and a wafer producing apparatus for producing a wafer from a semiconductor ingot.

Description of the Related Art

Devices such as integrated circuits (ICs), large scale integration (LSI) circuits, and light emitting diodes (LEDs) are formed on a semiconductor wafer made of silicon, sapphire, or the like by layering a functional layer on a face side of the wafer and demarcating a plurality of areas on the functional layer with a grid of projected dicing lines. A cutting apparatus, a laser processing apparatus, or the like then processes the semiconductor wafer along the projected dicing lines to divide the semiconductor wafer into individual device chips including the respective devices, which will be used in various electric appliances such as mobile phones and personal computers.

Power devices, LEDs, or the like are formed on a wafer made of single-crystal SiC by layering a functional layer on a face side of the wafer and demarcating a plurality of areas on the functional layer with a grid of projected dicing lines thereon. Wafers on which to form devices are generally produced by slicing a cylindrical semiconductor ingot with a wire saw. Face and reverse sides of the wafers sliced from the ingot are polished to a mirror finish (see, for example, JP2000-094221A).

However, it is uneconomical to slice a semiconductor ingot into wafers with a wire saw and polish the face and reverse sides of the wafers because much of the semiconductor ingot, e.g., 70% to 80% thereof, is wasted. Particularly, SiC ingots are disadvantageous in that they are of poor productivity as they are hard, difficult, and time-consuming to cut with a wire saw, and their unit cost is so high that they fail to produce wafers efficiently. The present applicant has proposed a technology in which a laser beam having a wavelength transmittable through single-crystal SiC is applied to an SiC ingot while positioning a focused spot of the laser beam within the SiC ingot, thereby forming separation layers in a projected severance plane in the SiC ingot, and then a wafer is separated from the SiC ingot along the projected severance plane where the separation layers are formed (see, for example, JP2016-111143A).

SUMMARY OF THE INVENTION

For applying the laser beam to the SiC ingot while positioning the focused spot of the laser beam accurately within the SiC ingot to form a separation layer in the SiC ingot and separating a wafer from the SiC ingot, it is necessary to accurately detect a height of an upper surface of the SiC ingot. In addition, as the height of the upper surface of the SiC ingot varies each time a wafer is produced from the SiC ingot, it is necessary to detect the height of the upper surface of the SiC ingot each time a wafer is produced from the SiC ingot, resulting in poor productivity.

It is therefore an object of the present invention to provide a wafer producing method and a wafer producing apparatus that are capable of producing wafers of a desired thickness from an ingot without the need for detecting the height of an upper surface of the ingot each time a wafer is to be produced from the ingot.

In accordance with an aspect of the present invention, there is provided a wafer producing method for producing a wafer from a semiconductor ingot, including: a holding step of holding the semiconductor ingot on a chuck table; a thermal stress wave generating step of applying a pulsed laser beam having a wavelength that is absorbable by the semiconductor ingot to an upper surface of the semiconductor ingot held on the chuck table to generate a thermal stress wave and propagating the thermal stress wave in the semiconductor ingot; a fracture layer forming step of applying a pulsed laser beam having a wavelength that is transmittable through the semiconductor ingot to the upper surface of the semiconductor ingot in synchronism with a time during which the thermal stress wave generated in the thermal stress wave generating step and propagated in the semiconductor ingot at a speed of sound depending on a material of the semiconductor ingot reaches a position corresponding to a thickness of a wafer to be produced from the semiconductor ingot, causing the pulsed laser beam whose wavelength is transmittable through the semiconductor ingot to be absorbed in a region where a band gap is reduced by a tensile stress of the thermal stress wave, thereby to form a fracture layer in the semiconductor ingot; and a peeling step of peeling off the wafer from the semiconductor ingot along the fracture layer.

Preferably, the wafer producing method further includes, after the peeling step, a planarizing step of planarizing a surface of the semiconductor ingot from which the wafer has been peeled off.

In accordance with another aspect of the present invention, there is provided a wafer producing apparatus for producing a wafer from a semiconductor ingot, including: a chuck table for holding the semiconductor ingot thereon; thermal stress wave generating means for applying a pulsed laser beam having a wavelength that is absorbable by the semiconductor ingot to an upper surface of the semiconductor ingot held on the chuck table to generate a thermal stress wave and propagating the thermal stress wave in the semiconductor ingot; and fracture layer forming means for applying a pulsed laser beam having a wavelength that is transmittable through the semiconductor ingot to the upper surface of the semiconductor ingot in synchronism with a time during which the thermal stress wave generated by the thermal stress wave generating means and propagated in the semiconductor ingot at a speed of sound depending on a material of the semiconductor ingot reaches a position corresponding to a thickness of a wafer to be produced from the semiconductor ingot, causing the pulsed laser beam whose wavelength is transmittable through the semiconductor ingot to be absorbed in a region where a band gap is reduced by a tensile stress of the thermal stress wave, thereby to form a fracture layer in the semiconductor ingot.

Preferably, the wafer producing apparatus further includes peeling means for peeling off the wafer from the semiconductor ingot along the fracture layer formed by the fracture layer forming means.

The wafer producing method according to the present invention allows the thickness of the wafer that is to be produced to be controlled only by the time during which the thermal stress wave is propagated at the speed of sound depending on the material of the semiconductor ingot, without the need for detecting the height of the upper surface of the semiconductor ingot, resulting in increased productivity.

Furthermore, the wafer producing apparatus according to the present invention, as with the wafer producing method, allows the thickness of the wafer that is to be produced to be controlled only by the time during which the thermal stress wave is propagated at the speed of sound depending on the material of the semiconductor ingot, without the need for detecting the height of the upper surface of the semiconductor ingot, resulting in increased productivity.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 2A is a schematic view, partly in block form, of an optical system of a laser beam applying unit of the wafer producing apparatus illustrated in FIG. 1;

FIG. 2B is an enlarged fragmentary sectional view of an ingot at the time a thermal stress wave generating step and a fracture layer forming step are carried out;

DETAILED DESCRIPTION OF THE PREFERRED EMBODIMENT

A wafer producing method according to a preferred embodiment of the present invention and a wafer producing apparatus according to the present embodiment that is suitable for carrying out the wafer producing method will hereinafter be described in detail below with reference to the accompanying drawings.

Figure 1:
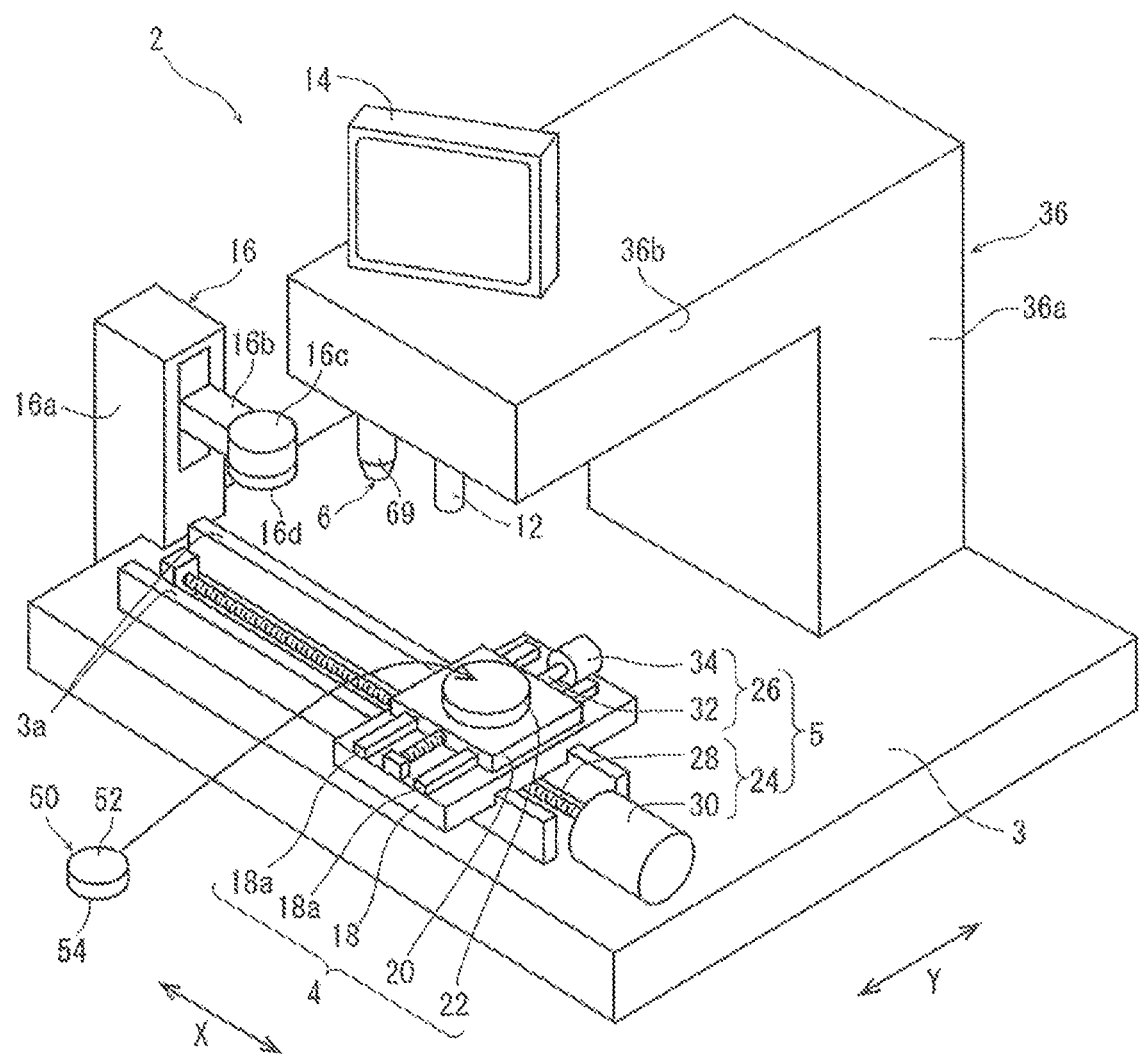
FIG. 1 is a perspective view of a wafer producing apparatus according to an embodiment of the present invention.

FIG. 1 illustrates in perspective the wafer producing apparatus, denoted by 2, according to the present embodiment. The wafer producing apparatus 2 includes a base 3, a holding unit 4 for holding a workpiece, a moving mechanism 5 for moving the holding unit 4, a laser beam applying unit 6 for applying a laser beam to the workpiece held by the holding unit 4, the laser beam applying unit 6 including thermal stress wave generating means and fracture layer forming means to be described later, an image capturing unit 12, a displaying unit 14, a peeling unit 16, and a control unit, not illustrated.

The holding unit 4 includes a rectangular X-axis movable plate 18 mounted on a front portion of the base 3 and movable along a pair of guide rails 3a extending in X-axis directions, a rectangular Y-axis movable plate 20 mounted on the X-axis movable plate 18 and movable along a pair of guide rails 18a extending in Y-axis directions, and a hollow cylindrical chuck table 22 rotatably mounted on an upper surface of the Y-axis movable plate 20. The X-axis directions are indicated by an arrow X in FIG. 1, and the Y-axis directions are indicated by an arrow Y in FIG. 1 and extend perpendicularly to the X-axis directions. An XY plane is defined by X and Y axes respectively along the X-axis directions and the Y-axis directions, and lies essentially horizontal.

The moving mechanism 5 includes an X-axis moving mechanism 24 for moving the X-axis movable plate 18 back and forth in the X-axis directions and a Y-axis moving mechanism 26 for moving the Y-axis movable plate 20 back and forth in the Y-axis directions. The X-axis moving mechanism 24 includes a ball screw 28 extending in the X-axis directions over the base 3 and an electric motor 30 coupled to an end of the ball screw 28. The ball screw 28 is operatively threaded through a nut, not illustrated, fixed to a lower surface of the X-axis movable plate 18. The X-axis moving mechanism 24 operates to convert rotary motion of the electric motor 30 into linear motion with the ball screw 28 and transmit the linear motion to the X-axis movable plate 18, moving the X-axis movable plate 18 back and forth in the X-axis directions along the guide rails 3a on the base 3.

The Y-axis moving mechanism 26 includes a ball screw 32 extending in the Y-axis directions over the X-axis movable plate 18 and an electric motor 34 coupled to an end of the ball screw 32. The ball screw 32 is operatively threaded through a nut, not illustrated, fixed to a lower surface of the Y-axis movable plate 20. The Y-axis moving mechanism 26 operates to convert rotary motion of the electric motor 34 into linear motion with the ball screw 32 and transmit the linear motion to the Y-axis movable plate 20, moving the Y-axis movable plate 20 back and forth in the Y-axis directions along the guide rails 18a on the X-axis movable plate 18. The moving mechanism 5 also includes a rotating mechanism, not illustrated, having an electric motor housed in the chuck table 22 for rotating the chuck table 22 about its central axis with respect to the Y-axis movable plate 20.

The wafer producing apparatus 2 also includes a frame 36 erected on a rear portion of the base 3 that is spaced from the front portion of the base 3. The frame 36 includes a vertical wall 36a extending upwardly from an upper surface of the base 3 and a horizontal beam 36b extending essentially horizontally from an upper end portion of the vertical wall 36a in overhanging relation to the moving mechanism 5. The horizontal beam 36b houses therein an optical system of the laser beam applying unit 6 that includes the thermal stress wave generating means and the fracture layer forming means to be described later. The laser beam applying unit 6 also includes a beam condenser 69 disposed on a lower surface of a distal end of the horizontal beam 36b of the frame 36.

The image capturing unit 12 is disposed on the lower surface of the distal end of the horizontal beam 36b at a position spaced from the beam condenser 69 in the X-axis directions. The image capturing unit 12 includes an ordinary image capturing device, i.e., a charge coupled device (CCD), for capturing an image of the workpiece with a visible light beam, infrared radiation applying means for applying an infrared radiation to the workpiece, an optical system for catching the infrared radiation applied by the infrared radiation applying means, and an image capturing device, i.e., an infrared CCD, for outputting an electric signal representing the infrared radiation caught by the optical system. The displaying unit 14, which is mounted on an upper surface of the horizontal beam 36b of the frame 36, displays the image captured by the image capturing unit 12.

The peeling unit 16 includes a casing 16a shaped as a rectangular parallelepiped extending upwardly from terminal ends of the guide rails 3a on the base 3 and an arm 16b extending in one of the X-axis directions from a proximal end thereof that is vertically movably supported in the casing 16a. The casing 16a houses therein lifting and lowering means, not illustrated, for lifting and lowering, i.e., vertically moving, the arm 16b. An electric motor 16c is disposed on a distal end of the arm 16b. The peeling unit 16 also includes a disk-shaped suction member 16d coupled to a lower surface of the electric motor 16c and rotatable about a vertical axis. The suction member 16d has a plurality of suction ports, not illustrated, defined in a lower surface thereof. Suction means, not illustrated, is connected through a fluid channel to the suction member 16d. The suction member 16d houses therein ultrasonic vibration imparting means, not illustrated, for imparting ultrasonic vibrations to the lower surface of the suction member 16d.

The control unit is constructed as a computer and includes a central processing unit (CPU) for performing arithmetic processing operations according to control programs, a read only memory (ROM) for storing the control programs, etc., and a read/write random access memory (RAM) for storing results of the arithmetic processing operations. The control unit is electrically connected to the moving mechanism 5, the laser beam applying unit 6, the image capturing unit 12, the displaying unit 14, and the peeling unit 16, and controls their operation.

According to the present embodiment, the workpiece that is processed by the wafer producing apparatus 2 is a cylindrical silicon (Si) ingot, hereinafter referred to simply as "ingot," 50 illustrated in FIG. 1. The ingot 50 has a circular upper surface 52 and a circular lower surface 54 positioned axially opposite the upper surface 52.

The optical system of the laser beam applying unit 6 housed in the horizontal beam 36b of the wafer producing apparatus 2 will be described in detail below with reference to FIG. 2A. As illustrated in FIG. 2A, the optical system of the laser beam applying unit 6 includes a first laser beam generator 6A for generating a first pulsed laser beam PL1 having a wavelength that is absorbable by the ingot 50, a second laser beam generator 6B for generating a second pulsed laser beam PL2 having a wavelength that is transmittable through the ingot 50, and a laser beam introducing unit 6C for applying the first pulsed laser beam PL1 generated by the first laser beam generator 6A and the second pulsed laser beam PL2 generated by the second laser beam generator 6B to the upper surface 52 of the ingot 50 that is held by the holding unit 4.

The first laser beam generator 6A includes first laser beam generating means 61 for generating and emitting the first pulsed laser beam PL1 and a reflecting mirror 62 for changing an optical path of the first pulsed laser beam PL1 emitted from the first laser beam generating means 61. The first laser beam generating means 61 includes a first laser oscillator 611 for emitting the first pulsed laser beam PL1 that has a wavelength of 355 nm, for example, and a first attenuator 612 for adjusting an output power of the first pulsed laser beam PL1 emitted from the first laser beam generating means 61 to a desired level and emitting the adjusted first pulsed laser beam PL1 toward the reflecting mirror 62.

The second laser beam generator 6B includes second laser beam generating means 63 for generating and emitting the second pulsed laser beam PL2 and delaying means 64 for delaying the second pulsed laser beam PL2 emitted from the second laser beam generating means 63 by a desired time. The second laser beam generating means 63 includes a second laser oscillator 631 for emitting the second pulsed laser beam PL2 that has a wavelength of 1064 nm, for example, and a second attenuator 632 for adjusting an output power of the second pulsed laser beam PL2 emitted from the second laser oscillator 631 to a desired level and emitting the adjusted second pulsed laser beam PL2. The second laser oscillator 631 operates at the same repetitive frequency as the first laser oscillator 611, and emits the second pulsed laser beam PL2 in synchronism with the first pulsed laser beam PL1. The delaying means 64 for delaying the second pulsed laser beam PL2 emitted from the second laser oscillator 631 may be implemented, for example, by an optical fiber, not illustrated, having a length corresponding to the time by which to delay the second pulsed laser beam PL2, so that the second pulsed laser beam PL2 delayed by the time can be output from the delaying means 64.

The laser beam introducing unit 6C includes a dichroic mirror 65 for reflecting the first pulsed laser beam PL1 reflected by the reflecting mirror 62 of the first laser beam generator 6A and transmitting the second pulsed laser beam PL2 from the second laser beam generator 6B, a reflecting mirror 66 for changing an optical path of the pulsed laser beams emitted from the dichroic mirror 65, an indexing scanner 67 constructed as a galvanometer scanner, for example, for indexing the pulsed laser beams reflected by the reflecting mirror 66 in the Y-axis directions over the chuck table 22, a scanning scanner 68 constructed as a resonant scanner, for example, for scanning the pulsed laser beams reflected by the reflecting mirror 66 in the X-axis directions over the chuck table 22, and a beam condenser 69 including an fθ lens 691 for converging the pulsed laser beams emitted from the scanning scanner 68 onto the upper surface 52 of the ingot 50 held on the chuck table 22 at a position defined by X-axis and Y-axis coordinates thereon. The first pulsed laser beam PL1 and the second pulsed laser beam PL2 that are led to the dichroic mirror 65 are applied to the same area on the chuck table 22.

The first laser beam generator 6A and the laser beam introducing unit 6C jointly make up the thermal stress wave generating means, denoted by H1 in FIG. 2A, according to the present invention. The thermal stress wave generating means H1 functions as means for applying the first pulsed laser beam PL1 whose wavelength is absorbable by the ingot 50 to the upper surface 52 of the ingot 50 held by the holding unit 4, generating a thermal stress wave, and propagating the thermal stress wave into the ingot 50.

Figure 3:
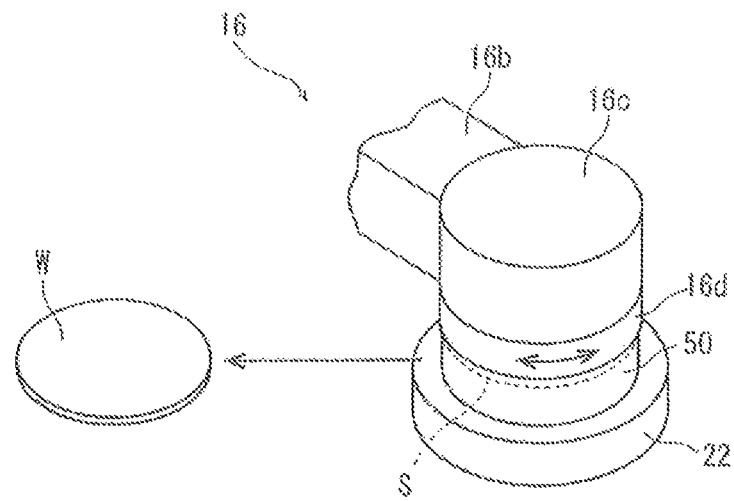
FIG. 3 is a perspective view illustrating a peel-off step.

The second laser beam generator 6B and the laser beam introducing unit 6C jointly make up the fracture layer forming means, denoted by H2 in FIG. 2A, according to the present invention. The fracture layer forming means H2 functions as means for applying the second pulsed laser beam PL2 whose wavelength is transmittable through the ingot 50 to the upper surface 52 of the ingot 50 in synchronism with a predetermined time during which the thermal stress wave generated on the upper surface 52 of the ingot 50 by the thermal stress wave generating means H1 and propagated in the ingot 50 at a speed of sound depending on the material of the ingot 50 reaches a depthwise position spaced from the upper surface 52 of the ingot 50 and corresponding to a thickness of a wafer W (see FIG. 3) to be produced from the ingot 50, e.g., at a depth of 1 mm from the upper surface 52 of the ingot 50, causing the second pulsed laser beam PL2 to be absorbed in a region where a band gap is reduced by a tensile stress of the thermal stress wave, thereby to form a fracture layer in the ingot 50.

The wafer producing method according to the present embodiment for producing the wafer W from the ingot 50 on the wafer producing apparatus 2 described above will hereinafter be described in specific detail below with reference to FIGS. 1, 2A, and 2B.

For producing the wafer W, which has a desired thickness of 1 mm, from the ingot 50, initially, the ingot 50 is held on the chuck table 22 of the holding unit 4 (holding step). Specifically, the ingot 50 is secured to the chuck table 22 by an adhesive, e.g., an epoxy resin adhesive, interposed between an upper surface of the chuck table 22 and the lower surface 54 of the ingot 50.

Then, for performing a thermal stress wave generating step and a fracture layer forming step, the moving mechanism 5 is actuated to move the chuck table 22 to a position directly below the image capturing unit 12, and the image capturing unit 12 captures an image of the ingot 50 and detects a position, i.e., a processing start position, on the upper surface 52 of the ingot 50 where the ingot 50 is to start being processed (alignment step). Then, the control unit, not illustrated, controls the moving mechanism 5 to position the processing start position on the upper surface 52 of the ingot 50 below the beam condenser 69.

Thereafter, the thermal stress wave generating means H1 is energized to generate the first pulsed laser beam PL1 whose wavelength of 355 nm is absorbable by the material (Si) of the ingot 50 and to apply the first pulsed laser beam PL1 through the laser beam introducing unit 6C to the upper surface 52 of the ingot 50 at a predetermined position thereon (thermal stress wave generating step).

Laser beam applying conditions in the thermal stress wave generating step are illustrated by way of example below. An average output power of the first pulsed laser beam PL1 is adjusted by the first attenuator 612 of the thermal stress wave generating means H1 to such a low level that, though the first pulsed laser beam PL1 is absorbable by the ingot 50, it does not cause ablation on the upper surface 52 of the ingot 50.

Wavelength: 355 nm
Repetitive frequency: 50 kHz
Average output power: 1 W
Pulse duration: 100 μs or less When the first pulsed laser beam PL1 is applied to the upper surface 52 of the ingot 50 in the thermal stress wave generating step, the upper surface 52 of the ingot 50 is thermally excited and a thermal stress wave generated by the thermal excitement of the upper surface 52 of the ingot 50 is propagated in the ingot 50 as indicated by N1→N2→N3 in FIG. 2B. The thermal stress wave is propagated in the ingot 50 progressively as indicated by N1→N2→N3 at a speed of sound (9620 m/s) depending on the material (Si) of the ingot 50. The thermal stress wave that is propagated in a semiconductor such as silicon represents a tensile stress wave of short pulses, and the band gap is narrower than usual in a position where a tensile stress is applied. In other words, a region where the band gap is reduced is propagated progressively in the ingot 50 from the upper surface 52 to the lower surface 54. The fracture layer forming step is carried out along with the thermal stress wave generating step as follows.

For carrying out the fracture layer forming step, the fracture layer forming means H2 is energized to emit the second pulsed laser beam PL2 whose wavelength of 1064 nm is transmittable through the material (Si) of the ingot 50 from the second laser oscillator 631 at the same repetitive frequency of 50 kHz as the first laser oscillator 611 in synchronism therewith. Then, the output power of the second pulsed laser beam PL2 is adjusted to a predetermined level by the second attenuator 632, and the second pulsed laser beam PL2 is delayed a predetermined time from the first pulsed laser beam PL1 by the delaying means 64. The predetermined time by which the second pulsed laser beam PL2 is delayed by the delaying means 64 refers to a time during which the thermal stress wave generated on the upper surface 52 of the ingot 50 in the thermal stress wave generating step and propagated in the ingot 50 at the speed of sound (9620 m/s) reaches a depthwise position spaced 1 mm from the upper surface 52 of the ingot 50 and corresponding to the thickness of the wafer W to be produced from the ingot 50. According to the present embodiment, the predetermined time is 103.9 ns. The second pulsed laser beam PL2 is applied through the laser beam introducing unit 6C to the area of the upper surface 52 of the ingot 50 to which the first pulsed laser beam PL1 has been applied.

Laser beam applying conditions in the fracture layer forming step are illustrated by way of example below.

Wavelength: 1064 nm
Repetitive frequency: 50 kHz
Average output power: 10 w
Pulse duration: 10 ns When the thermal stress wave generating step and the fracture layer forming step are carried out, the second pulsed laser beam PL2 applied by the fracture layer forming means H2 is delayed by the predetermined time of 103.9 ns from the first pulsed laser beam PL1 by the delaying means 64. As illustrated in FIG. 2B, the first pulsed laser beam PL1 is applied to the upper surface 52 of the ingot 50, forming the thermal stress wave that is propagated at the speed of sound depending on the material of the ingot 50 progressively as indicated by N1→N2→N3, and an area where the band gap is reduced is formed at a depthwise position P spaced 1 mm from the upper surface 52 and corresponding to the thickness of the wafer W to be produced. The second pulsed laser beam PL2 also applied to the ingot 50 is absorbed in the area thus formed, applying destructive stresses to the ingot 50 and locally fracturing the ingot 50.

As described above, the wafer producing apparatus 2 according to the present embodiment includes the scanning scanner 68 and the indexing scanner 67 as illustrated in FIG. 2A. The scanning scanner 68 and the indexing scanner 67 are actuated to apply the first pulsed laser beam PL1 and the second pulsed laser beam PL2 through the fθ lens 691 to the upper surface 52 of the ingot 50 within a predetermined area defined by X-axis and Y-axis coordinates, forming in the ingot 50 a fracture layer S that is 1 mm deep from the upper surface 52 of the ingot 50. The moving mechanism 5 is actuated to move the chuck table 22 in the X-axis directions and the Y-axis directions to position regions not irradiated by the first pulsed laser beam PL1 and the second pulsed laser beam PL2 successively in the area where the first pulsed laser beam PL1 and the second pulsed laser beam PL2 are applicable from the beam condenser 69, thereby carrying out the thermal stress wave generating step and the fracture layer forming step all over the upper surface 52 of the ingot 50 to form the fracture layer S fully across the ingot 50 at a depth of 1 mm from the upper surface 52 thereof.

Then, a peeling step for peeling off the wafer W from the ingot 50 at the fracture layer S is carried out. The peeling step will be described in detail below with reference to FIGS. 1 and 3.

For performing the peeling step, initially, the moving mechanism 5 is operated to move the chuck table 22 to a position below the suction member 16d of the peeling unit 16. Then, the lifting and lowering means, not illustrated, housed in the casing 16a is actuated to lower the arm 16b to bring the lower surface of the suction member 16d into intimate contact with the upper surface 52 of the ingot 50. Thereafter, the suction means, not illustrated, coupled to the suction member 16d is operated to attract the upper surface 52 of the ingot 50 under suction to the lower surface of the suction member 16d, and then the ultrasonic vibration imparting means housed, not illustrated, in the suction member 16d is operated to apply ultrasonic vibrations to the lower surface of the suction member 16d while at the same time the electric motor 16c is energized to rotate the suction member 16d. Now, the ingot 50 is fractured along the fracture layer S, peeling off the portion of the ingot 50 above the fracture layer S as the wafer W having the desired thickness of 1 mm. The peeling step is thus completed. After the peeling step has been carried out, the thermal stress wave generating step, the fracture layer forming step, and the peeling step are repeatedly carried out on the ingot 50 to produce wafers W successively from the ingot 50.

According to the present embodiment described above, the fracture layer S can be formed in the ingot 50 at a position corresponding to the thickness of 1 mm of the wafer W to be produced from the ingot 50 simply by applying the first pulsed laser beam PL1 whose wavelength is absorbable by the ingot 50 to the upper surface 52 thereof to generate and propagate the thermal stress wave in the ingot 50 and applying the second pulsed laser beam PL2 that is delayed by the time of 103.9 ns during which the thermal stress wave reaches the depthwise position corresponding to the thickness of 1 mm of the wafer W to be produced. Consequently, the thickness of the wafer W can be controlled without the need for detecting the height of the upper surface 52 of the ingot 50, resulting in increased productivity.

When the peeling step is carried out as described above, the surface of the ingot 50 from which the wafer W has been peeled off, i.e., a new upper surface 52 of the ingot 50, is rough because of surface irregularities left by the fracture layer S. For producing wafers W repeatedly from the ingot 50, therefore, it is preferable to carry out a planarizing step for planarizing the new upper surface 52 of the ingot 50 from which the wafer W has been peeled off.

For carrying out the planarizing step for planarizing the upper surface 52 of the ingot 50, the ingot 50 having the upper surface 52 from which the wafer W has been peeled off may be delivered to a separate grinding apparatus where the upper surface 52 is to be ground and planarized. Alternatively, the wafer producing apparatus 2 may additionally include a grinding unit that grinds and planarizes the upper surface 52 of the ingot 50. According to the present embodiment, the wafer producing apparatus 2 includes a grinding unit 7, partly illustrated in FIG. 4, mounted on the base 3 for performing a planarizing step to grind the upper surface 52 of the ingot 50 to planarize the same.

Figure 4:
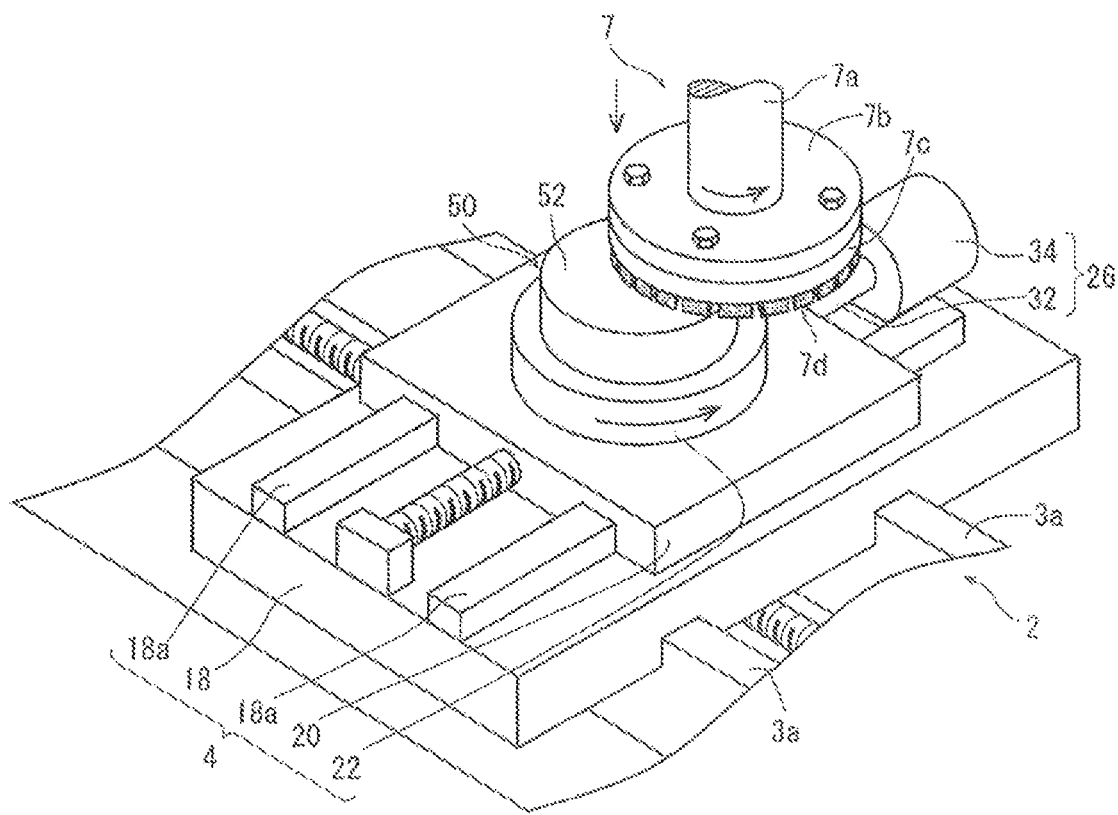
FIG. 4 is a perspective view illustrating a planarizing step.

As illustrated in FIG. 4, the grinding unit 7 includes a servomotor, not illustrated, a vertical spindle 7a rotatable about its central axis by the servomotor, a wheel mount 7b disposed on a lower end of the spindle 7a, a grinding wheel 7c fixed to a lower surface of the wheel mount 7b, and a plurality of grindstones 7d disposed in an annular array on a lower surface of the grinding wheel 7c. The grinding unit 7 has its vertical position accurately controlled in grinding feed directions, i.e., vertical directions, by lifting and lowering means, not illustrated, coupled thereto.

For carrying out the planarizing step, the chuck table 22 with the ingot 50 held thereon is positioned below the grinding unit 7 as illustrated in FIG. 4. Then, the chuck table 22 is rotated about its central axis at a rotational speed of 300 rpm, for example, by the rotating mechanism housed therein, and the grinding wheel 7c is rotated about its central axis at a rotational speed of 6000 rpm, for example, by the servomotor. The lifting and lowering means is operated to lower the grinding unit 7 to bring the grindstones 7d into contact with the upper surface 52 of the ingot 50 from which the wafer W has been peeled off. After having the grindstones 7d kept in contact with the upper surface 52 of the ingot 50, the lifting and lowering means further lowers the grinding unit 7 at a predetermined grinding feed speed of 0.1 µm/s, for example, thereby grinding and planarizing the upper surface 52 of the ingot 50.

After the upper surface 52 of the ingot 50 has been planarized, the thermal stress wave generating step, the fracture layer forming step, the peeling step, and the planarizing step are carried out again in the manner descried above. The wafer producing method according to the above sequence is repeated to produce a plurality of wafers W efficiently from the ingot 50. According to the above embodiment, the planarizing step is carried out using the grinding unit 7. However, the present invention is not limited to such details. The planarizing step may be carried out by polishing means having a polishing pad.

The present invention is not limited to the embodiment described above. In the above embodiment, the thermal stress wave generating means H1 and the fracture layer forming means H2 share the laser beam introducing unit 6C to apply the first pulsed laser beam PL1 and the second pulsed laser beam PL2 from one direction. However, it may not necessarily be required to apply the first pulsed laser beam PL1 and the second pulsed laser beam PL2 from one direction, but the thermal stress wave generating means H1 and the fracture layer forming means H2 may include respective different laser beam introducing units for applying the first pulsed laser beam PL1 and the second pulsed laser beam PL2 respectively at different angles to the ingot 50.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer producing method for producing a wafer from a semiconductor ingot, comprising:
   a holding step of holding the semiconductor ingot on a chuck table;
   a thermal stress wave generating step of applying a first pulsed laser beam having a wavelength that is absorbable by the semiconductor ingot to an area of an upper surface of the semiconductor ingot held on the chuck table to generate a thermal stress wave and propagating the thermal stress wave in the semiconductor ingot at a speed of sound depending on a material of the semiconductor ingot;
   a fracture layer forming step of applying a second pulsed laser beam, having a wavelength that is transmittable through the semiconductor ingot to the area of the upper surface of the semiconductor ingot on which the first pulsed laser beam was applied, a predetermined time delayed from a time the first pulsed laser beam was applied to the area of the upper surface in synchronism with a time the thermal stress wave generated in the thermal stress wave generating step reaches a position corresponding to a thickness of a wafer to be produced from the semiconductor ingot, causing the second pulsed laser beam whose wavelength is transmittable through the semiconductor ingot to be absorbed in a region where a band gap is reduced by a tensile stress of the thermal stress wave, thereby to form a fracture layer in the semiconductor ingot; and
   a peeling step of peeling off the wafer from the semiconductor ingot along the fracture layer.

2. The wafer producing method according to claim 1, further comprising:
   after the peeling step, a planarizing step of planarizing a surface of the semiconductor ingot from which the wafer has been peeled off.

3. The wafer producing method according to claim 1, wherein the second pulsed laser beam is synchronized at a same repetitive frequency with the first pulsed laser beam.

* * * * *